United States Patent

Marino

[15] 3,705,267

[45] Dec. 5, 1972

[54] SUPERVISORY CIRCUIT FOR MONITORING THE FORMATION AND TERMINATION OF INTERCONNECTIONS IN A TIME-DIVISION SWITCH

[72] Inventor: Patrick John Marino, Middletown, N.J.

[73] Assignee: Bell Telephone Laboratories, Incorporated, Murray Hill, N.J.

[22] Filed: Sept. 3, 1971

[21] Appl. No.: 177,690

[52] U.S. Cl. ..........................179/15 BY, 179/15 AQ

[51] Int. Cl. ..............................................H04j 3/12

[58] Field of Search.179/15 BY, 15 AS, 15 AQ, 2DP, 179/18 GF, 18 FC

[56] References Cited

UNITED STATES PATENTS 3,668,645 6/1972 Reymond ........................179/15 AS 3,564,144 2/1971 Diggelmann ....................179/15 BY

*Primary Examiner*—Kathleen H. Claffy
*Assistant Examiner*—David L. Stewart
*Attorney*—R. J. Guenther et al.

[57] ABSTRACT

A processor applies address data to individual time slots on an address bus to direct data in corresponding time slots on a data bus to outgoing channels. A supervisory circuit produces multi-byte messages describing processor transactions (formation of and taking down connections, et cetera) and produces accompanying address words to direct the messages to an outgoing monitoring path. If a time slot on the address bus does not contain an address word, indicating that this time slot is idle, a byte in the transaction message is inserted in the corresponding time slot on the data bus and the accompanying address word is written into the idle time slot on the address bus.

9 Claims, 8 Drawing Figures

FIG. 5A

| | STATUS WORD<br>INPUT TERMS 1 THRU 4 | REMAINDER OF INPUT<br>INPUT TERMS 5 THRU 11 | NEXT STATUS WORD<br>OUTPUT TERMS 1 THRU 4 | REMAINDER OF OUTPUT<br>OUTPUT TERMS 5 THRU 14 |
|---|---|---|---|---|
| STATE OPC1 | 1001 | IDLE<br>1000/ØØØ | NO CHANGE<br>0000 | 0000/0000/00 |
| | 1001 | ON-HOOK<br>0100/ØØØ | NO CHANGE<br>0000 | 0000/0000/00 |
| | 1001 | OFF-HOOK OR FREE<br>0010/1ØØ | OPC2<br>1010 | 1000/0010/00 |
| | 1001 | OFF-HOOK NO OR<br>0010/0ØØ | OPC20<br>1111 | 1000/1000/00 |
| | 1001 | ALL OTHER PATTERNS | NO CHANGE<br>0000 | 0000/0000/00 |
| STATE OPC2 | 1010 | ON-HOOK<br>0100/ØØØ | OPC20<br>1111 | 1000/0000/01 |
| | 1010 | ADDRESS CHARACTER 1<br>0001/Ø0Ø | NO CHANGE<br>0000 | 0000/0000/10 |
| | 1010 | ADDRESS CHARACTER 2<br>0001/Ø1Ø | OPC3<br>1011 | 1000/0000/10 |
| | 1010 | OFF-HOOK<br>0010/ØØØ | NO CHANGE<br>0000 | 0000/0000/00 |
| STATE OPC3 | 1011 | ON-HOOK<br>0100/ØØØ | OPC20<br>1111 | 1000/0000/01 |
| | 1011 | ALL OTHER PATTERNS | OPC4<br>1100 | 1000/0001/00 |
| STATE OPC4 | 1100 | ON-HOOK<br>0100/ØØØ | OPC20<br>1111 | 1000/0000/01 |
| | 1100 | ALL OTHER PATTERNS | OPC5<br>1101 | 1100/0000/00 |

FIG. 5B

| | | | | |
|---|---|---|---|---|
| STATE OPC5 | 1101 | ANY BYTE FREE OUTPUT CHANNEL ØØØØ/ØØ1 | CROSS-OFFICE ADDRESS 0000 | 0001/0000/01 |
| | 1101 | ANY BYTE NO OUTPUT CHANNEL ØØØØ/ØØ0 | OPC20 1111 | 1000/1000/01 |
| STATE OPC20 | 1111 | ALL PATTERNS | OPC1 1001 | 1000/0100/00 |
| CROSS OFFICE ADDR. | 0ØØØ | ON-HOOK 0100/ØØØ | OPC1 1001 | 1010/0000/00 |
| | 0ØØØ | ALL OTHER PATTERNS | CROSS-OFFICE ADDRESS 0000 | 0000/0000/00 |

FIG. 5C

| INPUT TERM. NO | |
|---|---|
| 1 | DECODED STATUS/ADDRESS WORD |
| 2 | |
| 3 | |
| 4 | |
| 5 | IDLE |
| 6 | ON-HOOK |
| 7 | OFF-HOOK |
| 8 | ADDRESS CHAR. |
| 9 | OR AVAILABLE |
| 10 | ONE CHAR. STORED |
| 11 | FREE OUTPUT CHANNEL |

| OUTPUT TERM. NO | |
|---|---|
| 1 | NEXT STATUS WORD |
| 2 | |
| 3 | |
| 4 | |
| 5 | NOPC |
| 6 | SET REVERSE |
| 7 | OPEN CIRCUIT |
| 8 | SET FWD/SEND RING |
| 9 | SEND BUSY |
| 10 | SEND IDLE |
| 11 | SEIZE OR/SEND DT |
| 12 | TRANSLATE |
| 13 | STORE OR |
| 14 | FREE OR |

FIG. 5D

FIG. 5A

FIG. 5B

SUPERVISORY CIRCUIT FOR MONITORING THE FORMATION AND TERMINATION OF INTERCONNECTIONS IN A TIME-DIVISION SWITCH

FIELD OF THE INVENTION

This invention relates to time-division switching systems for interconnecting incoming data channels to outgoing channels or ports by way of a common time-division multiplex data bus and, more particularly, to monitoring the formation and termination of the data channel interconnections in switching systems of the time-division multiplex type.

DESCRIPTION OF THE PRIOR ART

In the known forms of communication systems, common transmission paths may individually accommodate a plurality of signaling channels on a time-division multiplex basis. On these paths, each channel is assigned a time slot in a cycle or frame which is regularly repeated. Each time slot provides an interval during which the transmission path carries data which defines a sample or samples of the message signal from the channel source.

Switching systems for interconnecting channels on various common transmission paths preferably have the capability of interconnecting an incoming channel in any time slot on any one path with an outgoing channel in any time slot on any other path. More specifically, the switch provides both time switching (time slot interchange) and space switching (line interconnection). The time switching interchanges the data in time from the time slot assigned to the incoming channel to the time slot assigned to the outgoing channel. The space switching transfers the data from the incoming transmission path to the outgoing path.

In modern switching practices, the switch is divided into two portions; namely, the actual switch structure or organization which interchanges the data and interconnects the channels and the processor which develops data that controls the operations of the switch.

A preferred switch structure for interchanging data is disclosed in the copending application of T. H. Gordon-P. J. Marino-R. J. Pilc, Ser. No. 128,767, filed Mar. 29, 1971. In general, the application discloses a system organization wherein all the channels from all the incoming transmission paths are multiplexed onto a common data bus to create a superframe of data wherein each time slot in the superframe is assigned to a specific incoming channel on any one of the incoming paths. A time-division switch then provides the appropriate time and space switching to distribute the data from each time slot on the data bus to the desired output port; that is, to the time slot allocated to the outgoing channel on the desired outgoing path. More specifically, the application discloses a multi-lead data bus which accommodates the bits of a data byte, in parallel, during each time slot, a multi-lead address bus which accommodates the bits of an address word, in parallel, during each corresponding time slot, and a plurality of byte registers associated with each outgoing path and individually dedicated to each outgoing channel or port. The switch structure is directed by the accompanying address word on the address bus to transfer the data byte from the data byte bus to the byte register dedicated to the outgoing channel. The byte register then passes the bits of the byte onto the desired outgoing path within the time slot allocated to the outgoing channel. The generation of the address words and the application of these words to the address bus are functions provided, in part, by an address register or list which is one of the several circuits in the processor.

In systems wherein any one of the subscribers may call any one of the other subscribers, the general functions of the processor are to maintain a record of the status of each subscriber channel or the call progress of each call, to generate and transmit to the subscribers various supervisory signals, to process incoming information on the byte bus, to complete talking connections between subscribers and to take down the connections when a subscriber disconnects. Advantageously, the processor recognizes the initiation of a call by any incoming channel; returns "dial tone" to the originating subscriber; selects an originating register, stores "dialing" or address characters sent by the subscriber in the originating register; translates the dialing characters to a cross-office address word which identifies the terminating subscriber; sends "ringing" to the terminating subscriber; applies the cross-office address word of the originating subscriber to the address bus during the time slot dedicated to the terminating subscriber to set up the reverse connection; and applies the cross-office word of the terminating subscriber to the address bus during the time slot dedicated to the originating subscriber to complete the forward connection. The processor also takes down the connection when one of the parties disconnects.

As noted above, the processor stores or maintains a record of the status of each channel, including the progress of each call initiated by the subscriber. When the talking connection (forward and reverse) is complete, the processor stores or maintains a record of the cross-office address words of both subscribers in the connection.

In the copending application of T. H. Gordon-P. J. Marino-R. J. Pilc, Ser. No. 157,155, filed June 28, 1971, there is disclosed a processor which utilizes a recirculating store together with the address bus for maintaining the record of the cross-office address words. In addition, it is shown that the address words identify, in effect, a status of the channel; namely, the "talking" or "connected" status. Accordingly, the processor disclosed in this latter application develops and applies to the address bus either a status word or, alternatively, an address word to define the channel status. Since the words are developed alternatively, only one store is required. Each of the status words and the address words includes a flag bit which distinguishes the status word from the address word.

There are many reasons that one might desire to monitor the operations of the processor. For example, the monitoring of two transactions of the processor; namely, the completion of a "talking" connection and the subsequent "take down" of the connection, will provide billing information. Preferably, a supervisory signaling circuit cooperates with the processor to generate and store a data message identifying the subscribers involved in the connection, the time of day, the charging rate of the channel, etc., each time the processor performs a transaction. Accompanying address words are produced to identify the output channel or channels which extend to the monitor recorder or billing processor. The bytes of the transaction message and the accompanying address words are then applied to the data bus and address bus to forward the message to the monitoring channel.

It is apparent that the supervisory signaling circuit might be treated as an incoming channel. One time slot on the data bus could, therefore, be assigned and one byte of the transaction could then be applied to the data bus during each frame. A higher speed transfer of the transaction data from the signaling circuit might be desirable, however, to preclude build-up of the quantity of stored data bytes. In this latter event, a plurality of time slots per frame could be assigned to the signaling circuit. This would, however, increase the complexity of the processor and lower the rate that data is transferred for each individual channel or, alternatively, reduce the overall capacity of the data bus.

It is, therefore, an object of this invention to add incoming sources or signaling channels (such as supervisory signaling circuits) to a multiplex system and forward the data therefrom by way of the data bus without changing the transfer rate or capacity of the bus and without increasing the task of the processor.

SUMMARY OF THE INVENTION

The present invention recognizes that, during any frame, a plurality of channels are not in the "talking" status, that many channels are either disconnected or in the process of formulating a call. These channels, at this time, are not forwarding data and the data bus time slots assigned to the channels are "idle". In accordance with the present invention, the supervisory signaling circuit forwards its data by inserting the data onto the data bus during the several "idle" time slots. More specifically, the supervisory signaling circuit generates and stores the data bytes defining each transaction and produces accompanying address words to direct the data bytes to an outgoing path extending to a supervisory monitor. When an idle time slot appears, the supervisory circuit inserts a data byte onto the data bus and writes the accompanying address word into the corresponding time slot on the address bus.

It is a feature of this invention that the supervisory signaling circuit determines that an idle time slot is appearing on the data bus by monitoring the flag bit of the word on the address bus. The appearance of a flag bit identifying a status word (as opposed to an address word) indicates that the time slot is idle.

It is a further feature of this invention that the supervisory signaling circuit produces address words identifying successive time slots on the outgoing monitoring path to thereby forward successive bytes of a transaction to the successive time slots on the outgoing line.

The foregoing and other objects and features of this invention will be more fully understood from the following description of an illustrative embodiment thereof taken in conjunction with the accompanying drawings.

BRIEF DESCRIPTION OF THE DRAWINGS

In the drawings:

FIG. 5A and FIG. 5B, when arranged as shown in FIG. 5D, depict the various states of the processor control logic circuit together with the input information and output words thereby produced by the control logic, while FIG. 5C shows a table identifying the input and output terminals of the control logic and the information and word appearing thereon.

Detailed Description

GENERAL ORGANIZATION

Figure 1:
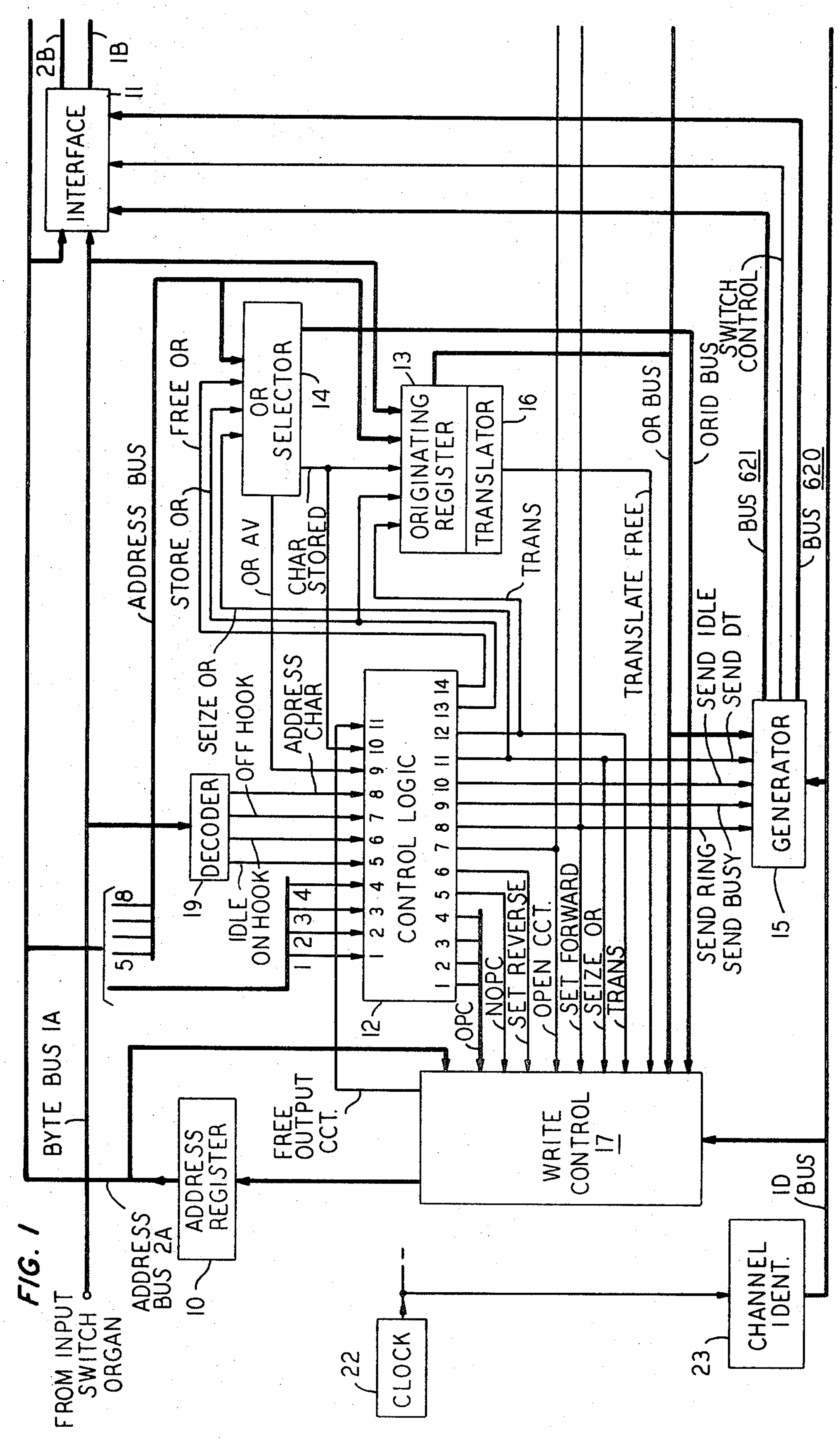
FIG. 1 shows, in block schematic form, the general organization of the processor and the manner in which the various circuits therein cooperate.

Incoming bytes from various incoming channels are assembled and are applied to a common byte bus 1A, FIG. 1, by an input switch organization, not shown, which organization may advantageously be the same type as input organization 100 disclosed in the above-identified copending application, Ser. No. 128,767.

Figure 2:
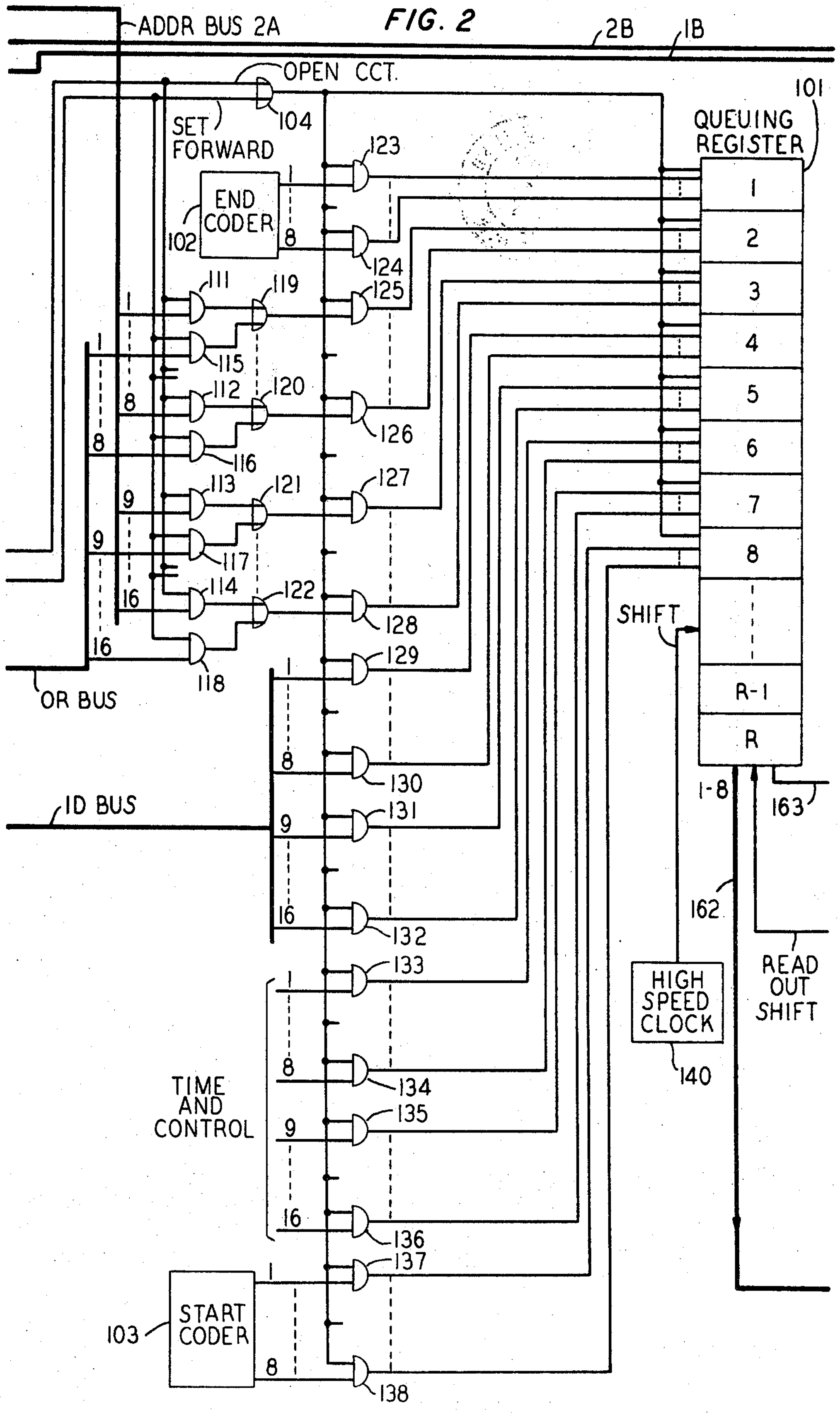
FIG. 2 and FIG. 3, when arranged with FIG. 1, as shown in FIG. 4, show, in block schematic form, the supervisory signaling circuitry which controls the monitoring of transactions, in accordance with this invention.
Figure 3:
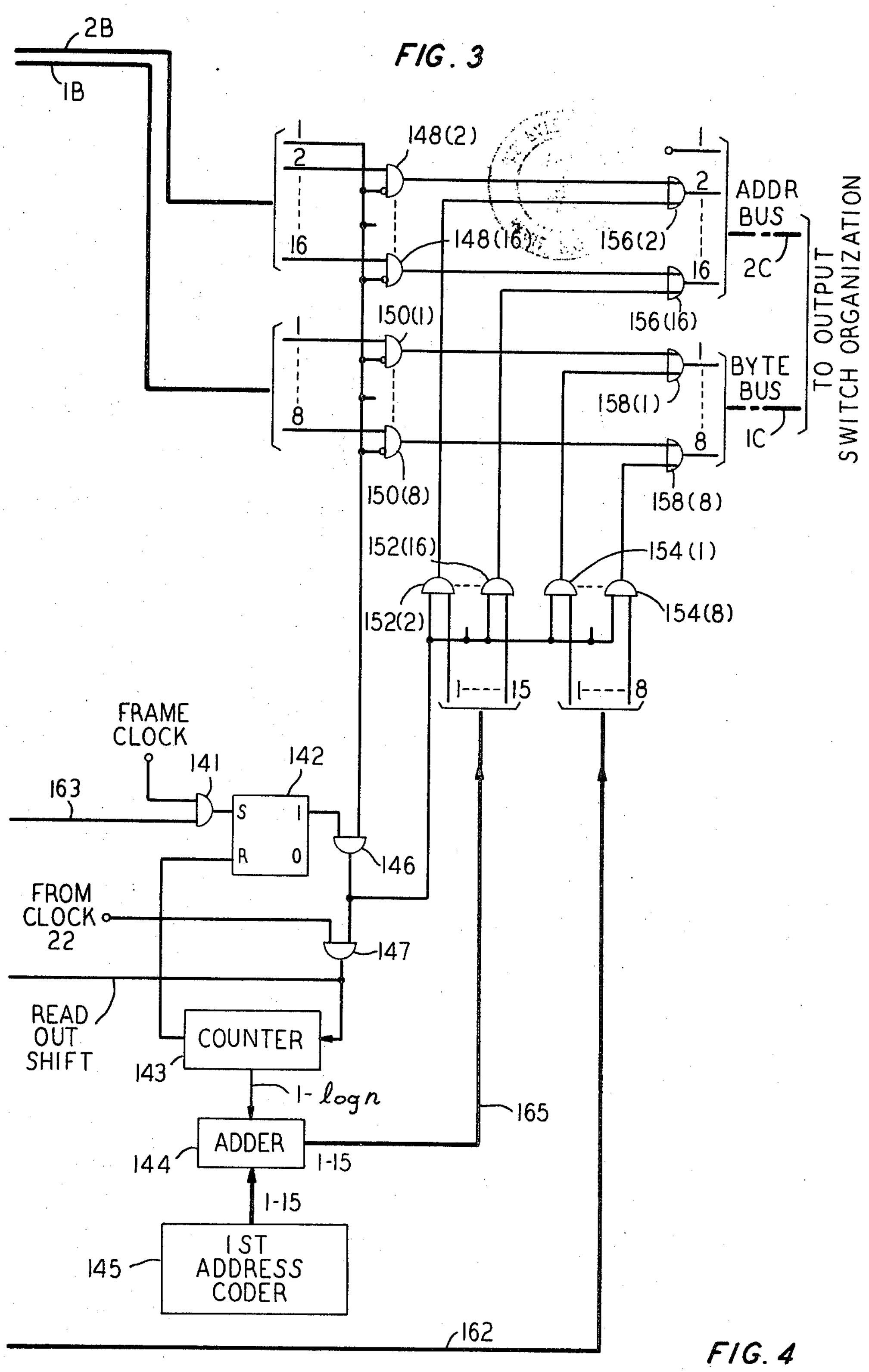
Figure 4:
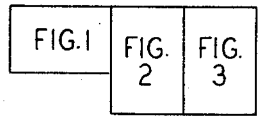

The outgoing byte bus is shown in FIG. 3 and is identified as byte bus 1C. Intermediate byte bus 1B is shown extending from FIG. 1 to FIG. 3 via FIG. 2. Byte bus 1A and byte bus 1B are interconnected by interface 11. Byte bus 1B and byte bus 1C are interconnected by logic gate circuitry shown in FIG. 3. The address words are applied to an "incoming" address bus, identified in FIG. 1 as address bus 2A. The outgoing address bus is bus 2C, FIG. 3, and the intermediate address bus is bus 2B. Address bus 2A and address bus 2B are interconnected by interface 11 and address bus 2B and outgoing address bus 2C are interconnected by logic circuitry in FIG. 3.

In general, the words applied to address bus 2A are formulated by a processor shown in FIG. 1. In addition, the processor controls the forwarding of the incoming bytes on byte bus 1A and the words on address bus 2A to byte bus 1B and address bus 2B, respectively. The supervisory signaling circuitry and, more particularly, the logic circuitry of FIG. 3, control the forwarding of the data onto byte bus 1C and address bus 2C. This logic circuitry is a portion of the supervisory control circuit which formulates the information in a transaction and sends the information to an output monitor port by way of byte bus 1C and address bus 2C. In accordance with the present embodiment, a transaction comprises either the completion of any talking connection between subscribers or the taking down of this connection when either subscriber disconnects. As described in detail hereinafter, the formulation and storage of data bytes describing each transaction is provided by that portion of the supervisory signaling circuitry constituting the logic gate circuitry of FIG. 2. That portion of the supervisory signaling circuitry constituting the logic circuitry of FIG. 3 detects idle time slots on address bus 2B, inserts appropriate addresses designating the monitoring port in the idle time slots on address bus 2C and inserts bytes from the stored transaction in the corresponding idle time slots on byte bus 1C.

In accordance with the present embodiment, byte busses 1A, 1B, and 1C comprise eight parallel leads, enabling each bus to accommodate, for any time slot, an eight-bit byte or character. Address busses 2A, 2B and 2C comprise sixteen parallel leads, enabling the busses to accommodate, for any time slot, a 16-bit address word (including the flag bit). As disclosed hereinafter, address bus 2A, on alternative occasions, will accommodate call progress or status words and other supervisory characters or words having four bits each. On these alternative occasions the call progress or status word will be accommodated on an initial four leads, while other supervisory words (specifically, originating register identity words) will be accommodated on a second four leads in address bus 2A. The address words, the status words and the OR identity words are all applied to address bus 2A by address register 10, which is a part of the processor.

As disclosed in the above-identified copending application, Ser. No. 128,767, the input switch organization assembles, from each incoming channel, an eight-bit byte or character, the bytes from the several channels are then applied, interleaved, to byte bus 1A to create a frame, each byte being passed, in parallel, to byte bus 1A in a time slot dedicated to the incoming data channel. As each byte appears in its time slot on byte bus 1A, the address register applies an address word (designating the outgoing channel) to address bus 2A during a concurrent time slot. This concurrent time slot is therefore also dedicated to the incoming data channel. The address word, together with the byte, are passed to output address bus 2C and output byte bus 1C, respectively, by the logic circuitry of FIG. 3, and then byte bus 1C and address bus 2C apply the bytes and words to the output switch organization. The output switch organization is preferably of the type disclosed in the copending application, Ser. No. 128,767, which organization has the capability of disassembling each byte and serially passing the byte to the outgoing channel defined by the address word.

THE PROCESSOR

The processor shown in FIG. 1 is substantially identical to the processor shown in the corresponding FIG. 1 in the copending application, Ser. No. 157,155. In general, the processor includes control logic 12, write control 17 and address register 10, together with other peripheral units described below. Address register 10 comprises a multistage shift register, the number of stages preferably corresponding to the number of time slots in each frame. Address register 10 may be driven by a time slot clock, such as clock 22, which clock has an output clock pulse for each time slot. Each stage in address register 10 has 16 cells, one cell for each bit in an address word and, correspondingly, for each lead of address bus 2A. As disclosed hereinafter, when a channel is connected to another channel, the first stage of address register 10 applies a 16-bit word to address bus 2A during the time slot of the channel. If the channel is not part of a connection, address register 10 applies a status word or a status word together with an originating register identity word to address bus 2A during each of the channel's time slots.

It is the general function of write control 17 to write into address register 10 (1) the appropriate status words when the call progress status of the channel changes, (2) the identity of an originating register when it is seized, and (3) the appropriate cross-office address words to complete the talking connection, and to recirculate the word applied to address bus 2A by address register 10 to the last stage of the address register when there is no change in the call progress status.

The determination of the next call progress status of the channels is provided by control logic 12. This determination is made in accordance with the information on address bus 2A, together with the information on byte bus 1A. The information on byte bus 1A is obtained by decoder 19 and a translation of this character is then passed to control logic 12. In general, control logic 12 therefore utilizes the information on the busses (and, in some instances as described hereinafter, other information provided by peripheral units) to determine the next state of the data channel. Control logic 12 thereupon advises write control 17 of this next state (and, in addition, provides instructions for the several other peripheral units). As noted above, write control 17 thereupon writes the appropriate words into address register 10. It is therefore noted that the sequence of functions involves writing in the appropriate information into address register 10, passing the information on to address bus 2A whereupon control logic 12 interprets the information, and then instructs write control 17 whether or not to write new information into address register 10 or recirculate the old information. The manner in which control logic 12, write control 17 and address register 10 cooperate, therefore, may be said to define the sequential operations of a sequential machine.

Proceeding now to the peripheral units noted above, these are identified as originating register (OR) selector 14, originating registers 13, together with translator 16, generator 15 and channel identifier 23. It is the function of channel identifier 23 to identify each time slot and, therefore, identify each incoming channel. Channel identifier 23 may comprise, for example, a conventional binary counter and, being driven by time slot clock 22, provides a different number for each time slot. Advantageously, the number identification provided by the channel identifier also comprises the 16-bit cross-office address word of the particular channel. This 16-bit number identification is passed to the ID bus.

Generator 15 is a logic and generator circuit which among its other functions generates certain supervisory characters used in common communication practices, such as a "busy" character, an "idle" character, a "dial tone" character and a "ringing" character. The other functions of generator 15 involve instructing interface 11 to overwrite one of these call progress characters onto byte bus 1B and at the same time to overwrite a cross-office address word onto address bus 2B, the cross-office address being obtained either from the ID bus, which extends from channel identifier 23, or the OR bus, which extends from originating registers 13.

Originating registers 13 are a plurality of registers or memories, each register having the capability of storing a 16-bit cross-office address word. During certain call progress intervals a register stage in originating registers 13 may be utilized to store one or both of the eight-bit address characters sent by an originating subscriber. Translator 16 functions to translate the two address characters stored by the originating register, convert the characters to the 16-bit cross-office word identifying the terminating subscriber and rewrite the cross-office word back into the originating register which originally stored the address characters. This cross-office word is applied to the OR bus to be utilized by write control 17 and generator 15 as noted above.

OR selector 14 is a control circuit for selecting and seizing originating registers and reading information into the originating registers. More specifically, OR selector 14 maintains a record as to which originating register in registers 13 is available and an additional record as to whether an address character has been inserted in the originating register. The identity of the next available originating register is passed to the ORID bus, to be utilized by write control 17, as previously disclosed. The information noting whether or not an address character has been inserted in the register is passed to the CHARACTER STORED lead and then utilized by control logic 12 and originating registers 13.

The details of the structures of write control 17, OR selector 14, originating registers 13 and generator 15 are disclosed in the above-identified copending application, Ser. No. 157,155.

CONTROL LOGIC

Considering control logic 12 in more detail, this circuit advantageously comprises a multiterminal switching circuit or network, sometimes called a combinational switching circuit, wherein a set or sets of input variables determine corresponding output conditions. Switching networks for combinational switching circuits of this type are described, for example, in Chapter 9, pages 135 to 156, of *Introduction to the Logical Design of Switching Systems* by H. C. Torng, published by Addison-Wesley Publishing Company, Copyright 1964.

As indicated above, a defined input pattern is applied to control logic 12 for each time slot. Accordingly, control logic 12 provides a corresponding output pattern for each time slot. As seen in FIG. 1, each input lead terminates on an individually numbered input terminal of control logic 12 and each output lead extends from an individually numbered output terminal of control logic 12. More specifically, the first four leads from address bus 2A are connected to input terminals 1 through 4. As noted above, these four leads carry the call progress status word while the channel is IDLE and while the call is being set up and carry the first four bits of the cross-office address word while the subscribers are interconnected.

Input terminals 5 through 8 are connected to the outputs of decoder 19. The bit pattern on terminals 5 to 8, therefore, comprises the decoded or translated byte that appears on byte bus 1A. Input terminals 9 and 10 are connected to the OR AVAILABLE and CHARACTER STORED leads originating from OR selector 14. Finally, input terminal 11 is connected to the FREE OUTPUT CHANNEL lead extending from write control 17. The function of this latter lead will be described hereinafter.

There are 14 output terminals in control logic 12. Output terminals 1 to 4 are connected to the OPC bus and the parallel bits of the next status word are applied to these output terminals. Output terminal 5 is connected to lead NOPC and control logic 12 applies a bit to this lead which instructs write control 17 to overwrite the new status word into address register 10. Output terminals 10 and 9 are connected to leads SEND IDLE and SEND BUSY respectively. The application of a bit to output terminal 11 provides the instruction via lead SEIZE OR/SEND DIAL TONE to seize an originating register and send the "dial tone" character. The application of a bit through output terminal 13 to lead STORE OR enables the originating register to store an incoming address character. The instruction to translate the address characters is applied to lead TRANSLATE by way of output terminal 12. Control logic 12 provides the instructions to set up the "reverse" connection and to set up the "forward" connection by applying bits to leads SET REVERSE and SET FORWARD by way of output terminals 6 and 8, respectively. The release of an originating register is provided by the application of a bit through output terminal 14 to lead FREE OR. Finally, opening or disconnecting a connection is initiated by the application of a bit to lead OPEN CIRCUIT via output terminal 7.

CONTROL LOGIC STATE TABLES

To define in detail the specific sequential operations of the sequential machine and, more specifically, the sequential states of control logic 12, the table shown in FIGS. 5A and 5B, when arranged as shown in FIG. 5D, is presented. For additional information, two tables are shown in FIG. 5C, the first table having a first column which identifies the numbers of the various input terminals of control logic 12 and a corresponding second column which defines the functions of the lead or group of leads extending to the corresponding input terminal. Similarly, in a second table, the first column identifies the numbers of the several output terminals of control logic 12 and the second column defines the functions of the output lead or group of leads extending from the corresponding output terminal.

The table shown in FIGS. 5A and 5B is arranged in four columns. As stated in the heading of the first column, this column defines the status word applied to control logic 12 and, accordingly, describes the bit pattern applied to input terminals 1 through 4. The second column is directed to the bit pattern applied to the remaining input terminals 5 through 11 of control logic 12. The next status word is identified in the third column which therefore shows the output bit pattern on output terminals 1 through 4. Finally, the last column is directed to the bit pattern on the remaining output terminals 5 through 14. The various lines in the table are grouped together in accordance with the call progress state or status of the processor. It is noted, therefore, that in the first state, namely, state OPC1, there are depicted five different input patterns of interest that are applied to control logic 12.

In the table each "1" and each "0" corresponds to a "1" bit or a "0" bit on the identified terminal. A 0 entry indicates an immaterial condition. An examination of several lines as examples will suffice for all the lines. Initially, refer to the several lines under the general heading "State OPC1". Under this condition the central processor present state is OPC1 and the input status word OPC1 (1001) is applied to input terminals 1 through 4. Selecting now the third line in the OPC1 state, it is seen that the OPC1 bit pattern is shown in the first column. The second column indicates that an "off-hook" byte or character is being received from the originating subscriber and an originating register is free. This input bit pattern, for input terminals 5 through 11, is 0010/100. The slash interposed between the fourth and fifth bits in this sequence is for the convenience of the reader to readily separate out the groups of bits. It is readily recognized, therefore, that the translated code sequence of the "off-hook" byte constitutes the four bits 0010, which bits are applied to input terminals 5 through 8. The next bit (after the slash is applied to input terminal 9 and constitutes a "1" bit. By referring to the first table in FIG. 5C, it is seen that this indicates that an originating register is available. The remaining bits are immaterial. As a result (in accordance with the third column), control logic 12 applies an OPC2 status word (1010) to output terminals 1 through 4 and the bit pattern 1000/0010/00 to the remaining output terminals. Therefore, "1" bits are applied to output terminals 5 and 11. The application of the "1" bit to output terminal 5 instructs (as described in detail hereinafter) write control 17 to overwrite the OPC2 word into address register 10. Referring to the second table in FIG. 5C, it is seen that the bit on output terminal 11 provides the instruction to seize an originating register and, at the same time, to send the "dial tone" character. Each of the other switch functions of control logic 12 can similarly be determined from an examination of the table together with an understanding of the sequential operation of the processor, as described hereinafter.

SEQUENCE OF PROCESSOR OPERATIONS

Consider now that, for any time slot, the processor is in the initial IDLE condition or state. During this time slot, the first stage of address register 10 is applying to the address bus 2A, and the address bus is in turn applying to input terminals 1 to 4 of logic circuit 12, a status word which defines the IDLE state. This status word is designated OPC1 and the bit sequence of the word, in serial bit form, comprises 1001. Assuming that the incoming channel occupying this time slot is in the IDLE condition, or in the "on-hook" condition, the byte bus carries an "idle" data word or an "on-hook" data word during the time slot. The data word ("idle" or "on-hook") is decoded by decoder 19, which, in turn, provides a translated code sequence (the bit sequence 1000 or 0100) to input terminals 5 to 8 of control logic 12. This input condition (the application of the IDLE status word to input terminals 1 to 4 and the translated "idle" or "on-hook" code sequence to terminals 5 to 8) is depicted in the first two columns of either the first or second line of the state chart shown in FIG. 5A, the remaining inputs to terminals 9 to 11 being immaterial. The consequent outputs of logic circuit 12 are shown in the second two columns of the first and second lines. These outputs constitute a "0" bit output pattern, output terminals 1 to 4 indicating no change for the next status word and output terminals 5 to 14 instructing the processor that there is no change in the processor functions for this time slot.

Concurrent with applying the status word to address bus 2A, the first stage of address register 10 passes the OPC1 status word to write control 17. When control logic 12 is not exercising any external control, write control 17 recirculates the status word to the last stage of the address register. The IDLE state status word OPC1 now will be shifted from the last stage, through the intermediate stages, to the first stage and will be reapplied to the address bus 2A during the same time slot in the next frame. The above sequence is thus again repeated, assuming the incoming channel remains IDLE or the subscriber remains "on-hook".

If the subscriber occupying the incoming channel originates a call by going "off-hook", an "off-hook" data word is transmitted and the time division switch inserts this data word in the time slot allocated to this originating subscriber. Decoder 19 detects the "off-hook" data word on byte bus 1A and applies a translated code sequence (such as 0010) to control logic 12. The OPC1 status word is concurrently being applied to control logic 12 by the address bus. This is depicted on the third and fourth lines for state OPC1 in FIG. 5A.

As described hereinafter, originating register selector 14 functions, in part, to indicate to control logic 12 whether an originating register in registers 13 is available. More specifically, originating register selector 14 is arranged to determine if an originating register is available, to indicate this availability to output lead OR AVAILABLE, to select and to seize the originating register, in response to a command from control logic 12 and to identify the seized originating register to the output ORID bus.

If it be assumed that an originating register is not available, selector 14 sends a "0" bit to lead OR AVAILABLE, which lead extends to input terminal 9 of control logic 12. We have assumed that the OPC1 status word and the "off-hook" data word are concurrently being applied to control logic 12. Under these input conditions, as seen on line 4 of state OPC1 in FIG. 5A, control logic 12 goes to the OPC20 (disconnect) state, applies the OPC20 status word (1111) to output terminals 1 to 4, applies a "write a new status word" (NOPC) bit through terminal 5 to the output NOPC lead, and applies a SEND BUSY bit to output terminal 9 (and thence to the output SEND BUSY lead). Write control 17, in response to the bit on the output NOPC lead, overwrites the new status word OPC20 into the last stage of address register 10 (rather than recirculating the old status word). Generator 15, in response to the bit on the SEND BUSY lead, obtains the identification of the time slot or channel concurrently on the ID bus from channel identifier 23, supplies the "busy" data word and the cross-office address word (which is advantageously arranged to be the same as the channel identification word) of the originating subscriber to interface unit 11, and applies a bit to the switch control lead extending to interface 11. Interface 11 thereupon overwrites the "busy" data word and the cross-office address word onto byte bus 1B and address bus 2B, respectively. Of course, these words are written into the busses in the time slot allocated to the originating subscriber.

In the subsequent frame, when the time slot of the originating subscriber again occurs, the OPC20 status word is applied to address bus 2A and passed to control logic 12. Regardless of other input conditions to control logic 12 (as shown for state OPC20 in FIG. 5B), the OPC1 word (1001) is applied to output terminals 1 to 4, the NOPC bit is applied to output terminal 5 and a bit is applied to the SEND IDLE output lead via output terminal 10. Generator 15, in response to the bit on the SEND IDLE lead, obtains the subscriber's identification from the ID bus from channel identifier 23, generates the "idle" data word, and enables interface 11 to overwrite the "idle" data word on byte bus 1B and the subscriber address on address bus 2B. Concurrently, write control 17 overwrites the OPC1 status word into the last stage of address register 10. The condition for the channel is thus returned to "idle" and the processor returns to the IDLE status.

Assume now that an originating register is available. In this event, originating register selector 14 sends a "1" bit through lead OR AVAILABLE to input terminal 9 of control logic 12. This is the input condition seen in line 3 of state OPC1 in FIG. 5A. The OPC1 status word and the translated "off-hook" code are concurrently being applied to control logic 12. The next status word will therefore be OPC2. Control logic 12 applies a bit to the SEND DIAL TONE/SEIZE OR lead by way of output terminal 11. This bit is passed to generator 15 and concurrently passed to write control 17 and to originating register selector 14. At the same time, control logic 12 applies the state OPC2 status word (1010) to output terminals 1 to 4 and applies the NOPC bit to output terminal 5.

The bit applies through output terminal 11 to the SEND DIAL TONE lead enables generator 15. The enabled generator obtains the subscriber identification from the channel identifier and enables interface 11 to overwrite the "dial tone" character on byte bus 1B and the address of the subscriber on address bus 2B. This same bit on output terminal 11 passes via the SEIZE OR lead to instruct originating register selector 14 to seize or select the available originating register in registers 13 and record an indication that the register in registers 13 and record an indication that the register is thereafter busy or unavailable. The identity of this seized register (the OR identity word) is passed by originating register selector 14 to write control 17 by way of the ORID bus. Finally, the bit on output terminal 11 instructs write control 17 to overwrite the originating register (OR) identity word obtained from the ORID bus, together with the state OPC2 status word, into the last stage of address register 10.

When the OPC2 status word is applied to the address bus, control logic 12 looks at byte bus 1A for incoming address characters from the subscriber (it being assumed that an address comprises two characters). AT the same time, address register 10 is applying the OR identity word to address bus 2A and the word is passed by the address bus to originating register selector 14.

In addition to the function of determining whether an originating register is available, originating register selector 14 also indicates whether or not an address character or byte has been stored in the corresponding originating register. This function is provided in response to the appearance of the OR identity word on address bus 2A, selector 14 thereby identifying the originating register and indicating to lead CHARACTER STORED whether a character byte is stored in the originating register. At this time, of course, no character is stored in the originating register and selector 14 passes a "0" bit to the CHARACTER STORED lead and thence to input terminal 10.

Return now to the OPC2 state wherein the OPC2 code is applied to address bus 2A. Assume now that the channel is "off-hook" and the first address character s have not yet been sent by the subscriber. The translated "off-hook" character is applied by decoder 19 to control logic 12. This condition is depicted on line 4 of state OPC2 in FIG. 5A. Control logic 12 provides a "0" bit output pattern. Write control 17 therefore recirculates the OPC2 status word in address register 10 from the initial stage to the final state. The OPC2 state of the circuit is thus maintained.

If, when the OPC2 status word is applied to address bus 2A, the originating subscriber goes "on-hook", the translated "on-hook" character is applied to control logic 12. In this event (as seen on line 1 of state OPC2 in FIG. 5A), control logic 12 goes to the OPC20 "-disconnect" state to disconnect the subscriber and return the processor to the initial IDLE condition. This operational sequence is described in detail hereinafter.

Assume now that the first address word is received on byte bus 1A. The word is scanned by decoder 19 and the translated word is applied to control logic 12. At the same time, of course, address bus 2A is applying the OPC2 status word and originating register selector 14 is indicating that not character is stored in the originating register (see line 2 of state OPC2). Control logic 12, in response thereto, applies a bit through output terminal 13 to the STORE OR lead. This bit instructs originating registers 13 to store the address word. The originating register identified by the OR identity word on address bus 2A is selected and the first address character is stored therein. At the same time, control logic 12 is applying the bit on the STORE OR lead to selector 14 and selector 14, in turn, now indicates that an address character is stored in the originating register.

Control logic 12 provides no function with respect to write control 17. Write control 17 therefore recirculates the originating register identity word and the OPC2 status word from the first stage to the last stage of address register 10.

Control logic 12 looks for the second address character when the OPC2 status word next appears on address bus 2A. Originating register selector 14, under control of the OR identity word on address bus 2A, is concurrently applying to input terminal 10 of control logic 12 a "1" bit indicating that one character is stored in the originating register.

If the word on byte bus 1A at this time indicates that the subscriber is still "off-hook" but has not yet sent the second address word, control logic 12 maintains the same status (line 4 of state OPC2). Write control 17, under this situation, recirculates the status word OPC2 and the OR identity word from the first stage to the last stage of address register 10. If the subscriber goes "on-hook" (line 1 of state OPC2), control logic 12 goes to the OPC20 state, as described hereinafter.

In the event, however, that the second address word appears on byte bus 1A, the translation of this word is passed by decoder 19 to control logic 12. Other inputs to control logic 12 are, of course, the OPC2 status word provided by address bus 2A and the indication from originating register selector 14 that one character is stored in the originating register (see line 3 of state OPC2 in FIG. 5A). Control logic 12, in response thereto, passes a bit through output terminal 13 and then by way of the STORE OR lead to originating registers 13. At this time, of course, originating register selector 14, under control of the OR identity word on address bus 2A, sends to originating registers 13 a "1" bit indicating that one character is stored in the originating register. The OR identity word applied by the address bus to registers 13 selects the identified register and the second address character is shifted into the originating register with the previously stored first character.

In addition to enabling the storage of the second address character, control logic 12 also applies the OPC3 status word (1011) to output terminals 1 to 4 and concurrently passes the NOPC bit to output terminal 5. Write control 17, therefore, overwrites the OPC3 word into the last stage of address register 10. The OR identity word is again recirculated, whereby the last stage contains the new OPC3 word and the recirculated OR identity word.

In the next frame, the OPC3 status word is applied to the address bus and the processor goes to state OPC3. Assume that the subscriber has not gone to the "on-hook" condition. In this event (line 2, state OPC3 in FIG. 5A), control logic 12 passes the OPC4 status word (1100) to terminals 1 to 4, passes the NOPC bit to terminal 5, and applies a bit to output terminal 12 onto the TRANSLATE lead.

The bit on the TRANSLATE lead is applied to registers 13. This enables the address characters in the originating register (selected by the OR identity word) to be read out and applied to translator 16 under the assumption that translator 16 is not occupied in translating for another channel. Under this assumption, originating registers 13 apply a bit to the TRANSLATE FREE lead and translator 16 provides a conventional translation of the address words, converting them to the cross-office address code of the terminating subscriber identified by the address. This code is then reapplied back into the originating register. (The functions of translator 16, of course, are not necessary when the incoming address characters are arranged to be identical to the cross-office address code.)

The "NOPC" bit, the "TRANSLATE" bit and the "-TRANSLATE FREE" bit are all applied to write control 17 together with the OPC4 status word. This enables write control 17 to overwrite the OPC4 word, and recirculate the OR identity word, into the last stage of address register 10. The processor, in the next frame, will proceed to the OPC4 state.

In the event that translator 16 is not free or available, originating registers 13 do not pass the bit to the TRANSLATE FREE lead. Write control 17, lacking this bit, recirculates the OPC3 status word and the OR identity word from the address bus to the last stage of address register 10. The OPC3 state will therefore be repeated for the next frame and each subsequent frame until translator 16 becomes available.

The originating subscriber might go "on-hook" at any time while the circuit is in the OPC2, OPC3 or OPC4 states. In any of these states, when the decoded byte is applied to input terminals 5 to 8, control logic 12 applies the OPC20 status word (1111) to output terminals 1 to 4, applies the NOPC bit to output terminal 5 and applies a bit through output terminal 14 to the FREE OR lead. The OPC20 status word is overwritten into the last stage of address register 10 by write control 17. The bit passed to the FREE OR lead is applied to originating register selector 14 which, in response thereto, returns to the original indications wherein the originating register is available and no characters are stored therein.

When the OPC20 status word is applied to address bus 2A, control logic 12 goes to the OPC20 state (FIG. 5B). As previously described, control logic 12 generates, in this state, the OPC1 (idle) status word and applies "1" bits to the NOPC and SEND IDLE leads. Write control 17 overwrites into the last stage of address register 10 the OPC1 status word, the "idle" data word is written into byte bus 1B and the subscriber cross-office address word is written into address bus 2B, as previously described. The status of the channel is thus returned to the initial IDLE condition.

Return now to the situation where the OPC4 status word appears on address bus 2A. Control logic 12 goes to the OPC4 state. In this state the processor initiates the operation of writing the reverse connection into address register 10. Assume that the subscriber has not gone "on-hook". As seen in line 2 of state OPC4, control logic 12 applies a bit to output terminal 6, which is connected to the SET REVERSE lead, applies the OPC5 status word (1101) to output terminals 1 to 4 and the NOPC bit to output terminal 5. The bit on the SET REVERSE lead is passed to write control 17 to write in the "reverse connection". If the "reverse connection" circuit in write control 17 is not available (busy with another channel), write control 17 recirculates the OPC4 status word and the OR identity word back into address register 10. State OPC4 will be repeated until the reverse connection circuit becomes available.

Assume now that the "reverse connection" circuit in write control 17 is available. Write control 17 thereupon overwrites the OPC5 status word and recirculates the OR identity word into address register 10. In addition, write control 17 obtains and stores the cross-office address of the originating subscriber from the ID bus (which extends from channel identifier 23) and obtains the cross-office address word of the terminating subscriber from the OR bus (which extends to originating registers 13). Utilizing the terminating subscriber cross-office address word (and successive channel identifications provided by channel identifier 23), write control 17 selects the time slot which corresponds to the time slot of the terminating subscriber and reads off the status word on address bus 2A to determine whether or not the terminating subscriber channel is idle or busy; that is, whether or not the OPC1 status word is on the bus.

If the terminating subscriber is idle (the OPC1 word is applied to the bus by address register 10), write control 17 returns a "1" bit to input terminal 11 of control logic 12 and maintains this indication until it is subsequently knocked down. In addition, the cross-office address of the originating subscriber previously obtained from channel identifier 23 is overwritten into the last register stage of the terminating subscriber. It is noted that the cross-office address word thus written in will occupy all of the storage cells in the register stage, with the initial (or flag) bit of the address word occupying the same cell normally reserved for the initial (or flag) bit of the status word. This flag bit (for the cross-office address word) is always "0", whereas the status word flag bit is always "1". The processor will hereinafter be able to recognize the cross-office address word and determine that the subscriber is part of a "talking" connection.

Assume now that the terminating subscriber is BUSY (a word other than the OPC1 status word is applied to address bus 2A). A "0" bit is returned by write control 17 to input terminal 11 of control logic 12. When the OPC5 status word appears on address bus 2A and is applied to control logic 12, the logic circuit initiates the action to take down the call. (See line 2 of state OPC5 in FIG. 5B). Control logic 12 applies the OPC20 status word to output terminals 1 through 4, the NOPC bit to output terminal 5, a bit through output terminal 9 to the SEND BUSY lead, and a bit through output terminal 14 to the FREE OR lead. Write control 17 overwrites the OPC20 status word into the last stage of address register 10.

As previously described, the application of the bit to the SEND BUSY lead enables generator 15 (together with interface 11) to overwrite the cross-office address word of the subscriber onto address bus 2B and overwrite the "send busy" character onto byte bus 1B. The bit on the FREE OR lead is passed to originating register selector 14. As previously described, originating register selector 14, in response to the "free OR" bit, overwrites "0" bits into the flag cells to restore the indications that the originating register is available and that no character is stored therein.

When the OPC20 status code again appears on the address bus, control logic 12 initiates the operation of returning the "idle" code character to the originating subscriber and overwrites the OPC1 code into the address register, as previously described.

Return now to the condition wherein the reverse connection was completed and write control 17 applied a "1" bit to input terminal 11 of control logic 12. When the OPC5 status word appears on address bus 2A, control logic 12 applies a bit through output terminal 8 to the SET FORWARD lead and the SEND RING lead and applies a bit through output terminal 14 to the FREE OR lead. The "set forward" bit enables write control 17 to obtain the cross-office address word of the terminating subscriber from the OR bus (extending from originating registers 13) and overwrite the word into the final stage of address register 10. At the same time write control 17 knocks down the "1" bit applied to input terminal 11 of control logic 12. The "send ring" bit is applied to generator 15. Generator 15, in response to the bit, overwrites the "ringing" word onto byte bus 1B via interface 11, obtains the cross-office address word of the terminating subscriber from the OR bus (extending from originating registers 13) and overwrites this word onto address bus 2B via interface 11. The "ringing" character is therefore directed by the time-division switch to the channel of the terminating subscriber.

The "free OR" bit applied to output terminal 14 is passed to originating register selector 14. Selector 14, in response thereto, returns to the original "register available" and "no characters stored" indications, thus "freeing" the originating register.

With the cross-office address word of the terminating subscriber hereinafter appearing on the address bus during the time slot allocated to the originating subscriber and the cross-office address word of the originating subscriber hereinafter appearing on the address bus during the time slot allocated to the terminating subscriber, a time-division switch of the type disclosed in the above-identified copending application, Ser. No. 128,767, will forward the data from the originating subscriber to the channel of the terminating subscriber and forward the data from the terminating subscriber to the channel of the originating subscriber. The processor, recognizing the flag bits of the cross-office addresses, will not interfere with the cross-office connection (see line 2 of the "Cross-Office Address" state in FIG. 5B) so long as neither subscriber sends a "disconnect" or "on-hook" word.

The "disconnect" or "on-hook" word may appear on the byte bus during either time slot; that is, during the time slot of the originating subscriber or the time slot of the terminating subscriber. The operation of the processor is substantially the same for the "disconnect" from either subscriber.

Assume that the "disconnect" signal is received from one of the communicating subscribers (hereinafter referred to as the A subscriber). The address code word of the other subscriber (hereinafter referred to as the B subscriber) is concurrently on address bus 2A. Decoder 19 accepts the "disconnect" or "on-hook" word from byte bus 1A and applies a translated word (0100) to control logic 12. Control logic 12 recognizes the address word on address bus 2A and the concurrent "on-hook" word on byte bus 1A and, in response thereto, applies the OPC1 code to output terminals 1 through 4, applies the NOPC bit to output terminal 5 and applies a bit through output terminal 7 to the OPEN CIRCUIT lead (see line 1 of the "Cross-Office Address" state in FIG. 5B).

The "open circuit" bit is passed to write control 17 to "take down" the call. If the "call take down" circuit is busy with another channel, however, write control 17 recirculates the address word in address register 10. The "Cross-Office Address" state is therefore repeated until the "call take down" circuit becomes available.

Assume now that the "call take down" circuit is free. Write control 17 overwrites the OPC1 status word into the last stage of address register 10. At the same time, write control 17 obtains the cross-office address of the B subscriber from address bus 2A and now locates the time slot allocated to the B subscriber. When the subscriber B time slot occurs, write control 17 overwrites the OPC1 status word into the last stage of address register 10. Both subscriber channels are therefore returned to the IDLE condition.

SUPERVISORY SIGNALING CIRCUIT

As previously noted, the formulation of the information in a transaction is provided by the logic gate circuitry shown in FIG. 2, much of the information being derived from the processor previously described. Each transaction constitutes eight data bytes. Upon formulation, the eight data bytes of the transaction are stored in queueing register 101. Thereafter, when an idle time slot appears on address bus 2B, indicating a correspondingly idle time slot on byte bus 1B, a data byte is removed from queueing register 101 by the logic circuitry shown in FIG. 3 and is applied to outgoing bus 1C. At the same time, an address word is developed and passed to outgoing address bus 2C.

It is to be appreciated that the outgoing path extending to the transaction monitor or recorder has associated therewith the same byte register structure as any other outgoing path. Each byte register, therefore, is identifiable by an individual address word, starting from an initial word or number and advancing through successive numbers until the final byte register is reached. In accordance therewith, the circuitry of FIG. 3 initially generates an address word which identifies the first byte register in the monitoring outgoing path. Thereafter, the address word generated for each succeeding byte which is drawn from queueing register 101 is a number greater in magnitude by one than the preceding word, whereby the data bytes are stored in successive byte registers. It is appreciated that in accordance with the copending application, Ser. No. 128,767, the successive byte registers thereupon serially pass the bits of the successive bytes onto the outgoing path and then to the transaction monitor or recorder.

Each transaction constitutes eight data bytes. If the transaction constitutes the completion of a connection from an originator to a terminating subscriber, the items of information to be stored by the circuitry of FIG. 2 comprise a START word, time and control information, the identity of the originating subscriber, the identity of the terminating subscriber, and an END word. The START word is provided by start coder 103, which comprises a conventional code generator. The START word comprises one data byte consisting of eight bits which are applied, in parallel, to the eight output leads of start coder 103. These output leads extend to eight gates, of which the first and last gates are shown and identified as gates 137 and 138.

The time and control information constitutes information designating the time of day and further control information, such as charging rates, class of service, etc. All of this information is derived from the office clock, together with a circuit cooperating with channel identifier 23, the latter circuit providing the control information for each of the channels in a conventional manner. This time and control information advantageously comprises two eight-bit bytes, the bits of the two bytes being applied to the 16 leads extending to gates 133 through 136.

The identity of the originator is derived from the ID bus. This identity requires sixteen bits and the information is therefore included in two data bytes. The sixteen leads of the ID bus extended to gates 129 through 132.

The identity of the terminating subscriber is obtained from the OR bus. The 16 leads of the OR bus extend to gates 115 to 118.

The END word is generated by end coder 102. The END word comprises one data byte and the eight bits are passed, in parallel, to the inputs of gates 123 to 124.

If the transaction constitutes the take down of a call, the information in the transaction constitutes the START word, the time and control information, the identity of the channel that generated the on-hook, the identity of the subscriber terminating the other end of the connection and the END word. The START code word, the time and control information and the END word are generated in the same manner as previously described for the completion of the connection transaction. The identity of the disconnecting subscriber is similarly obtained from the ID bus. The identity of the other subscriber, in this case, is obtained from address bus 2A. The sixteen leads of address bus 2A extend to gates 111 to 114.

The information formulated for each transaction is stored in queueing register 101. Queueing register 101 contains R stages, the number of stages being sufficient to store a plurality of transactions. The stages of queueing register 101 are numbered from 1 to R, as shown in FIG. 2. Each of the register stages includes nine cells. The stage, therefore, has sufficient capacity to store an eight-bit byte and an "additional" bit. This "additional" bit is utilized for the purpose of indicating whether or not a byte is stored in that stage.

The additional bit is derived from the output of OR gate 104. As described hereinafter, when the eight bytes of a transaction are stored in queueing register 101, gate 104 provides a "1" bit at its output. This bit is thereupon passed to stages 1 to 8 of register 101 and stored in the cells therein allocated to the "additional" bit.

Stage 1 of queueing register 101 stores the eight bits of the END word byte derived from the outputs of gates 123 to 124 and, in addition, stores the "additional" bit derived from OR gate 104. Stage 8 stores eight bits of the START word byte, together with the "additional" bit. Stages 6 and 7 store the two data bytes defining the time and control information, and each stores the "additional" bit. Stages 4 and 5 store the two data bytes constituting channel identity and each stores the "additional" bit.

Inputs to stages 2 and 3 comprise gates 125 through 128. The inputs of these gates are derived from either gates 111 to 114 or gates 115 to 118 by way of OR gates 119 through 122. Accordingly, stages 2 and 3 store the two data bytes designating the subscriber identity on address bus 2A or the subscriber identity on the OR bus, depending upon whether gate sets 111 through 114 or gate sets 115 through 118 are enabled, as described hereinafter.

In general, queueing register 101 functions to accept the various bytes defining a transaction in the first eight stages thereof and then to rapidly shift the bytes toward the final stage R. This shifting is provided by a high-speed clock, such as high-speed clock 140, the pulse rate of the clock being substantially higher than the office clock. Queueing register 101 is arranged to high-speed shift the information toward stage R until either stage R or a register stage having a data byte stored therein is reached. A shift register of this type is disclosed in FIGS. 9 and 10 of U.S. Pat. No. 3,292,156, which issued to N. H. Stochel on Dec. 13, 1966.

The eight bits defining each byte, when stored in stage R, are applied, in parallel, to eight leads shown as cable 162. At the same time, the "additional" bit stored in stage R is passed to lead 163. If an incoming bit is received on lead READ OUT SHIFT, stage R of queueing register 101 is cleared out, clearing out the eight-bit word and the "additional" bit stored therein. As a result, the information in stage R-1 is shifted to stage R and the information in the prior stages is shifted down one stage. In this manner the data bytes stored in queueing register 101 are successively read out to the circuitry in FIG. 3.

Starting from an initial idle or quiescent state, the operation of the logic circuitry of FIG. 3 is initiated at the beginning of an output line frame when stage R of queueing register 101 has a data byte stored therein. The dual requirement that stage R has a byte stored therein and that a line frame is terminating (and another is about to begin) is determined by gate 141.

One input lead of gate 141 constitutes lead 163, which, as previously described, indicates whether an "additional" bit is stored in stage R of queueing register 101. The other input to gate 141 extends to the output line clock, which constitutes a ring counter, not shown herein, but disclosed as ring counter 215 in FIG. 2 of copending application, Ser. No. 128,767. More specifically, the other lead of gate 141 advantageously extends to the frame clock output lead CD(24), which extends from the ring counter. As described in the copending application, each output line frame terminates when lead CD(24) is pulsed. Under this assumption and if we further assume that a data byte is stored in stage R of queueing register 101 whereby a bit is applied to lead 163, gate 141 is enabled. This sets flip-flop 142, to initiate a cycle of operation.

The setting of flip-flop 142 enables gate 146. The other input to gate 146 extends to the first lead of address bus 2B. As previously discussed, the first lead of address bus 2B carries the initial (or flag) bit of the address or status word on the bus. When an address word is presently on the bus a "0" bit is applied to the first lead. Alternatively, a "1" bit is applied to the first lead when a status word is on the bus.

The first lead of address bus 2B also extends to the NOT inputs of gates 148(2) to 148(16) and gates 150(1) to 150(8). If we assume that an address word is on the bus, the "0" bit on the first lead enables gates 148(2) to 148(16) and gates 150(1) to 150(8) and disables gate 146. The enabling of gates 148(2) to 148(16) passes the bits of the address word on leads 2 to 16 of address bus 2B through to OR gates 156(2) to 156(16) to leads 2 to 16 of the output address bus which is designated in FIG. 3 as address bus 2C. The first lead of bus 2C is open-circuited and therefore always has a "0" bit applied thereto. At the same time, the enabling of gates 150(1) to 150(8) passes the byte on byte bus 1B through the gates and through OR gates 158(1) to 158(8) to output byte bus 1C.

If, during any time slot, an address word does not appear on the address bus, a data byte is not being switched to an output line. Under this situation, which is referred to as an "idle time slot", a status word appears on the address bus. Therefore, during any "idle time slot", a "1" bit is on the first lead of the address bus. This "1" bit disables gates 148(2) to 148(16) and gates 150(1) to 150(8), thereby blocking the passage of any information on address bus 2B and byte bus 1B to output address bus 2C and byte bus 1C. At the same time the "1" bit on the first lead of address bus 2B is passed to gate 146. If we presume that flip-flop 142 is set, as previously described, gate 146 is enabled by the high condition output of the flip-flop and the "1" bit from address bus 2B is passed therethrough to enable gate 147 and concurrently enable gates 152(2) to 152(16) and 154(1) to 154(8).

The other input to gate 147 is derived from clock 22 (FIG. 1). It is recalled that clock 22 is the time slot clock which produces an output clock pulse for each time slot on address bus 2B. Accordingly, one clock pulse will be passed through gate 147 during the idle time slot; that is, the interval that the "1" bit is on the first lead of address bus 2B. This clock pulse is passed to counter 143 and lead READ OUT SHIFT.

We have previously indicated that the "1" bit on the first lead of address bus 2B, when applied through gate 146, enables gates 154(1) to 154(8). The other inputs to gates 154(1) to 154(8) constitute the eight output leads from stage R of queueing register 101, which output leads are designated as cable 162. Accordingly, the eight bits of the data byte presently in stage R are passed through gates 154(1) to 154(8) and then out through OR gates 158(1) to 158(8) to byte bus 1C. Accordingly, during the "idle time slot", the byte on byte bus 1C constitutes the data byte read out of stage R of queueing register 101.

The information to be applied to address bus 2C during the "idle time slot" is derived from adder 144. The inputs to adder 144, in turn, comprise first address coder 145 and counter 143. First address coder 145 is a word coder which generates the number corresponding to the address of the first byte register in the output organization of the outgoing path extending to the monitor. This number is then added to the output of counter 143, the sum designating the address of the specific byte register which will store the data byte on the byte bus. It is, therefore, a function of adder 144 to add the first address number to the counter number, thus providing an address word designating the registers of address.

The input to counter 143 is derived from the output of gate 147. Initially, the counter is set to zero and the output of adder 144 constitutes the output word on first address coder 145. In other words, the output of adder 144 constitutes the address word designating the first byte register in the output organization of the path extending to the monitoring unit. If, as we have presumed, a new frame has been initiated and a word is stored in the final stage of queueing register 101, gates 152(2) to 152(16) are enabled and the address word output of adder 144 is passed through the enabled gates and OR gates 156(2) to 156(16) to address bus 2C.

At this time, the pulse from clock 22 is passed through gate 147, enabled, to counter 143. In response to the termination of the clock pulse, counter 143 is advanced one count. At the same time, the clock pulse from clock 22 is passed through gate 147 to the lead READ OUT SHIFT. At the termination of the clock pulse, the information in the final stage of queueing register 101 is cleared out. The information in stage R-1 is thereupon shifted to stage R, the new byte is applied by way of cable 162 to gates 154(1) to 154(8) and, with counter 143 advanced, the new address word is developed by adder 144, which address word has a quantity which is one greater than the previous address word, thereby designating the next successive byte register. The circuit is now in condition to again read out the byte and the address word on cables 162 and 165, respectively, upon the appearance of another "idle time slot" on address bus 2B. The sequence of the read out, the clearing out of the final stage of queueing register 101 and the advance of counter 143 would thereupon proceed in the same manner as the previous read out described above.

We will now proceed through a sequence starting with a transaction by the processor. It is recalled that a transaction may constitute either the completion of a talking connection or the termination of the talking connection. The completion of the talking connection occurs with the processor in state OPC5 and the existence of a free output channel. In this event, the processor applies a bit to lead SET FORWARD. The bit on lead SET FORWARD enables gates 115 through 118 and at the same time is passed through OR gate 104 to enable gates 123 through 138. Gates 115 through 118, when enabled, obtain the OR identity word from the OR bus and pass the word through OR gates 119 through 122 to gates 125 through 128. At the same time, the enabling of gates 123 through 138 operates to store the eight bytes defining the transaction in the first eight stages of queueing register 101. At the same time, the output bit of OR gate 104 inserts the "additional" bit in the first eight stages of the queueing register. The eight bytes of the transaction are thus inserted in the queueing register and are rapidly shifted through the stages of the register until the last stage R is reached or until a stage having a byte stored therein is reached.

The transaction, alternatively, may constitute the termination of a talking connection. This occurs if the talking connection presently exists and an on-hook is received by one of the subscribers. In this event, a bit is applied to lead OPEN CIRCUIT. The bit on lead OPEN CIRCUIT is applied through OR gate 104 to enable gates 123 through 138. At the same time, the bit on lead OPEN CIRCUIT enables gates 111 through 114. This passes the address word on address bus 2A to gates 125 through 128 (it being recalled that this address word identifies the subscriber remote from that subscriber who has just disconnected). This address word is passed through gates 125 to 128 to stages 2 and 3 of queueing register 101. With gates 122, 123 and 129 through 138 also enabled, the other six bytes of the transaction designating the termination of the talking connection are inserted in stage 1 and stages 4 to 8 of queueing register 101, together with the "additional" bit in the same manner as the insertion of information for the completion of a connection. These eight bytes are then rapidly shifted down to final stage R.

We have assumed that one or more transactions are now stored in queueing register 101. The "additional" bit now stored in stage R is passed through lead 163 to enable gate 141. The frame clock pulse is then passed through gate 141 to set flip-flop 142. When an "idle time slot" occurs on address bus 2B, the "1" bit of the status word on lead 1 is applied to gate 146. Gate 146, which has been enabled by flip-flop 142, passes the "1" bit therethrough to enable gates 152(2) through 152(16); 154(1) through 154(8); and 147. When gates 152(2) through 152(16) are enabled, they obtain the address word from adder 144 and pass the word to address bus 2C. We have presumed that the circuitry of FIG. 3 has been in the initial quiescent state. The address word derived from adder 144 therefore corresponds to the first address generated by first address generator 145 and therefore designates the first byte register in the output organization of the output line extending to the monitor. At the same time, the enabled gates 154(1) through 154(8) obtain the byte in stage R of queueing register 101 and apply the byte to byte bus 1C.

With gate 147 enabled, the clock pulse from clock 22 is passed therethrough. The termination of this clock pulse clears out stage R of queueing register 101, permitting the subsequent bytes in the queueing register to advance one stage. At the same time, the clock pulse, after a similar delay, advances counter 143 one count. We have presumed that the circuitry is in the initial condition and the counter is therefore advanced to the count of one. This count of one is applied to adder 144 and the output of adder 144, therefore, constitutes the address word number which is one greater in quantity than the first address applied by first address generator 145. The circuit now awaits the appearance of the next "idle time slot".

Upon the appearance of the next "idle time slot" the "1" bit in the first lead of address bus 2B is again applied through gate 146. The new address output of adder 144 is passed to address bus 2C and the byte in stage R of queueing register 101 is passed to byte bus 1C. The information in stage R is again cleared out, permitting the prior stages to shift their information one stage. In addition, counter 143 is advanced another count.

In a similar manner, each succeeding byte in queueing register 101 is read out each time and "idle time slot" appears. Each time a readout occurs, the byte is applied to byte bus 1C and, in a corresponding time slot, an address is passed to address bus 2C, the word number of the address being advanced by one count for each successive one of the byte readouts. As a consequence, the several bytes stored in queueing register 101 are each individually switched to a byte register, each successive byte being directed to a successive one of the byte registers. It is to be noted that this process may continue through one or more frames of the output organization.

When a byte is stored in the final one of the registers in the output organization associated with the output path leading to the monitor, the count in counter 143 has reached its maximum. The clock pulse that is passed through gate 147 to advance counter 143 is thereupon effective to reset the counter. Upon its reset, counter 143 resets flip-flop 142. This returns the circuitry to its initial quiescent condition. The circuitry must thereupon await the termination of the frame in order to re-initiate operation, as previously described.

Although a specific embodiment of this invention has been shown and described, it will be understood that various modifications may be made without departing from the spirit of this invention.

I claim:

1. In a time-division switch for forwarding data signals in individual time slots on an incoming data bus to selected outgoing ports as directed by address words in corresponding time slots on an address bus, a signaling circuit for inserting supplementary data signals into the data bus comprising, means for storing the supplementary data signals, means for producing accompanying address words, and means responsive to an idle time slot on the address bus for withdrawing a stored data signal from the storing means, for writing the produced address word accompanying the withdrawn data signal into the idle time slot on the address bus and for writing the withdrawn data signal into the corresponding time slot on the data bus.

2. In a time-division switch, a signaling circuit in accordance with claim 1 wherein each address bus time slot accommodates a flag bit indicating the presence of an address word in the time slot and the means responsive to an idle time slot includes means for monitoring the flat bit.

3. In a time-division switch for receiving data bytes in individual time slots on the incoming side of a data bus and forwarding the data bytes to selected outgoing ports by way of the outgoing side of the data bus as directed by address words in corresponding time slots on an address bus, an interface circuit for inserting supplementary data bytes onto the outgoing side of the data bus comprising, gate means interposed between the incoming side and the outgoing side of the data bus for passing bytes from the incoming side of the outgoing side thereof, means for producing and storing the supplementary data bytes, means for producing address words to accompany each of the stored data bytes, and means for detecting an idle time slot on the address bus and, in response thereto, for disabling the gate means, for withdrawing a stored data byte from the storing means, for writing the produced word accompanying the withdrawn byte into the idle time slot on the address bus and for writing the withdrawn data byte into the corresponding time slot on the outgoing side of the data bus.

4. In a time-division switch, an interface circuit in accordance with claim 3 wherein the means for detecting an idle time slot includes means for monitoring a flag bit appearing in each time slot on the address bus, said monitoring means including means for enabling the gate means in response to the monitoring of a flag bit of one type and means for enabling the idle time slot detecting means in response to the monitoring of a flag bit of another type.

5. In a time-division switch for receiving data bytes in individual time slots on an incoming data bus and applying the data bytes to selected time slots on time-division lines as directed by address words in time slots on an address bus, each address bus time slot corresponding to the data bus time slot accommodating the data byte directed by the address word, a supervisory signaling circuit for forwarding the bytes of a supervisory message to time slots on a predetermined time-division line, comprising, means for producing and storing successive bytes of the supervisory message, means for generating address words designating successive time slots on the predetermined line, and means responsive to detection of an idle time slot on the address bus for inserting a generated address word therein and inserting a stored message byte into the corresponding time slot on the data bus.

6. In a time-division switch, a supervisory signaling circuit in accordance with claim 5 wherein the means responsive to the detection of an idle time slot inserts successive ones of the bytes of the message onto the data bus and successive ones of the address words onto the address bus in response to the detection of successive ones of the idle time slots.

7. In a time-division switch, a supervisory signaling circuit in accordance with claim 6 wherein the means for generating the address words includes means for generating the address word designating a first one of the time slots on the predetermined line and means responsive to the detection of each idle time slot for modifying the generated address word to designate the next successive one of the time slots on the predetermined line.

8. In a time-division switch, a supervisory signaling circuit in accordance with claim 7 wherein the modifying means is reset in response to the generation of a final one of the time slots on the time-division line.

9. In a time-division switch, a supervisory signaling circuit in accordance with claim 7 wherein the modifying means is enabled in response to the storage of a message byte and the initiation of a frame of the predetermined line.

* * * * *